United States Patent
Werner et al.

(10) Patent No.: US 11,227,163 B2
(45) Date of Patent: Jan. 18, 2022

(54) SMART CONTAINMENT STRUCTURE FOR APITHERAPY

(71) Applicant: International Business Machines Corporation, Armonk, NY (US)

(72) Inventors: John S. Werner, Fishkill, NY (US); Robert K. Overton, Olivebridge, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 16/122,791

(22) Filed: Sep. 5, 2018

(65) Prior Publication Data
US 2020/0068855 A1 Mar. 5, 2020

(51) Int. Cl.
*G06K 9/00* (2006.01)
*G06Q 50/02* (2012.01)
*A01K 47/06* (2006.01)

(52) U.S. Cl.
CPC ..... *G06K 9/00771* (2013.01); *G06K 9/00335* (2013.01); *G06K 9/00369* (2013.01); *G06Q 50/02* (2013.01); *A01K 47/06* (2013.01)

(58) Field of Classification Search
CPC ............ A01K 47/06; G06K 9/00369; G06K 9/00771; G06K 9/00335; G06Q 50/02
See application file for complete search history.

(56) References Cited

U.S. PATENT DOCUMENTS

| 4,374,440 A | 2/1983 | Drapkin | |
| 2015/0123801 A1* | 5/2015 | de Leon | A01K 47/06 340/573.3 |
| 2016/0353715 A1 | 12/2016 | Temby et al. | |
| 2017/0360010 A1* | 12/2017 | Wilson-Rich | A01K 47/06 |

FOREIGN PATENT DOCUMENTS

| CN | 203898711 U | 10/2014 |
| RU | 173689 U1 | 9/2017 |
| WO | 2007133056 A1 | 11/2007 |
| WO | 2015166292 A1 | 11/2015 |
| WO | 2017217815 A1 | 12/2017 |

OTHER PUBLICATIONS

Chiron et al., Detecting and tracking honeybees in 3D at the beehive entrance using stereo vision, EURASIP Journal on Image and Video Processing, Springer. (Year: 2013).*
"The American Apitherapy Society Inc.," 2018, 2 pages, retrieved from http://www.apitherapy.org/.

* cited by examiner

*Primary Examiner* — Kenny A Cese
(74) *Attorney, Agent, or Firm* — Zilka-Kotab, P.C.

(57) ABSTRACT

An apparatus according to one embodiment includes a container having an interior, and a divider in the interior of the container. The divider selectively separates the interior into first and second compartments. The divider is configured to keep bees located in the first compartment separated from bees in the second compartment when in a closed configuration, and to allow the bees positioned in the first compartment to enter the second compartment when in an open configuration. The apparatus also includes an image capture device for capturing images of the bees in the interior of the container, and an outlet for permitting ingress and egress of the bees from the second compartment. The container is configured to prevent the bees from escaping from the first compartment.

20 Claims, 6 Drawing Sheets

SMART CONTAINMENT STRUCTURE FOR APITHERAPY

BACKGROUND

The present invention relates to a structure suitable for extending the life of bees, and more specifically, this invention relates to a smart containment structure for apitherapy.

Apitherapy is the medicinal use of products derived from honeybees including bee venom, honey, pollen, royal jelly, beeswax, etc. The medicinal use of bee venom is the most prevalent among apitherapy patients. Apitherapy has been used to treat many illnesses or to alleviate pain from chronic or acute injuries, multiple sclerosis, arthritic, wounds, gout, shingles, burns, tendonitis, fibromyalgia, neuralgias, Bell's palsy, carpal tunnel syndrome, herpes zoster, osteoarthritis, infections, etc.

An average user of bee venom will sting themselves approximately 3 to 5 times per week. Users will typically order bees through the mail and keep the bees in a ventilated jar until the bees are needed. Bees are generally only able to live in conventional, ventilated jar environments for about two weeks. A typical user does not have the resources to maintain a hive and must frequently replenish their stock of bees. When new bees are ordered, the new bees cannot immediately be combined with any existing bees due to conflicting queen pheromones associated with each set of bees. Bees will typically fight and kill bees carrying a different queen's pheromone.

SUMMARY

An apparatus according to one embodiment includes a container having an interior and a divider in the interior of the container. The divider selectively separates the interior into first and second compartments. The divider is configured to keep bees located in the first compartment separated from bees in the second compartment when in a closed configuration, and to allow the bees positioned in the first compartment to enter the second compartment when in an open configuration. The apparatus also includes an image capture device for capturing images of the bees in the interior of the container, and an outlet for permitting ingress and egress of the bees from the second compartment. The container is configured to prevent the bees from escaping from the first compartment.

A computer-implemented method according to one embodiment includes receiving images of bees in an interior of a container having a divider selectively separating the interior into first and second compartments. The divider is configured to keep bees located in the first compartment separated from bees in the second compartment when in a closed configuration. The divider is also configured to allow the bees positioned in the first compartment to enter the second compartment when in an open configuration. The computer-implemented method also includes performing visual recognition analysis on the images of the bees for characterizing interaction between the bees in the first compartment and the bees in the second compartment. The computer-implemented method also includes causing a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

A computer program product according to one embodiment includes receiving, by the computer, images of bees in an interior of a container having a divider selectively separating the interior into first and second compartments. The divider is configured to keep bees located in the first compartment separated from bees in the second compartment when in a closed configuration. The divider is also configured to allow the bees positioned in the first compartment to enter the second compartment when in an open configuration. The computer program product also includes performing, by the computer, visual recognition analysis on the images of the bees for characterizing interaction between the bees in the first compartment and the bees in the second compartment. The computer program product also includes causing, by the computer, a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

Other aspects and embodiments of the present invention will become apparent from the following detailed description, which, when taken in conjunction with the drawings, illustrate by way of example the principles of the invention.

DETAILED DESCRIPTION

Figure 1:
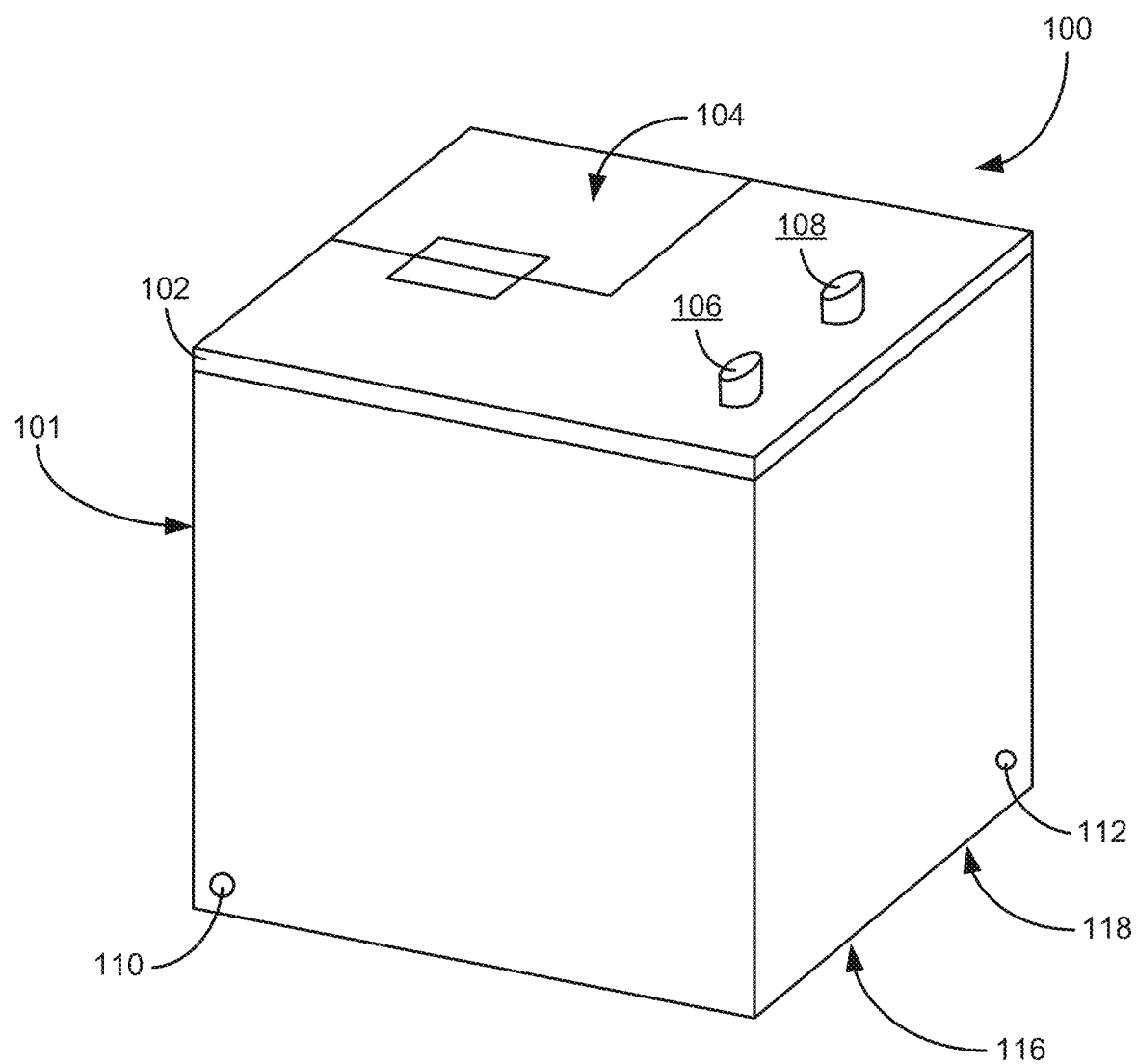
FIG. 1 illustrates an exemplary smart containment apparatus for apitherapy in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for a smart containment structure for apitherapy.

In one general embodiment, an apparatus includes a container having an interior, and a divider in the interior of the container. The divider selectively separates the interior into first and second compartments. The divider is configured to keep bees located in the first compartment separated from bees in the second compartment when in a closed configuration, and to allow the bees positioned in the first compartment to enter the second compartment when in an open configuration. The apparatus also includes an image capture device for capturing images of the bees in the interior of the container, and an outlet for permitting ingress and egress of the bees from the second compartment. The container is configured to prevent the bees from escaping from the first compartment.

In another general embodiment, a computer-implemented method includes receiving images of bees in an interior of a container having a divider selectively separating the interior into first and second compartments. The divider is configured to keep bees located in the first compartment separated from bees in the second compartment when in a closed configuration. The divider is also configured to allow the bees positioned in the first compartment to enter the second compartment when in an open configuration. The computer-implemented method also includes performing visual recognition analysis on the images of the bees for characterizing interaction between the bees in the first compartment and the bees in the second compartment. The computer-implemented method also includes causing a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

In another general embodiment, a computer program product includes receiving, by the computer, images of bees in an interior of a container having a divider selectively separating the interior into first and second compartments. The divider is configured to keep bees located in the first compartment separated from bees in the second compartment when in a closed configuration. The divider is also configured to allow the bees positioned in the first compartment to enter the second compartment when in an open configuration. The computer program product also includes performing, by the computer, visual recognition analysis on the images of the bees for characterizing interaction between the bees in the first compartment and the bees in the second compartment. The computer program product also includes causing, by the computer, a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

FIG. 1 depicts an exemplary smart containment apparatus 100 for apitherapy in accordance with one embodiment. As an option, the present exemplary smart containment apparatus 100 may be implemented in conjunction with features from any other embodiment listed herein, such as those described with reference to the other FIGS. Of course, however, such an exemplary smart containment apparatus 100 and others presented herein may be used in various applications and/or in permutations which may or may not be specifically described in the illustrative embodiments listed herein. Further, the exemplary smart containment apparatus 100 presented herein may be used in any desired environment.

As shown, the apparatus 100 includes a container 101 with a removable top 102, a hinged access area 104, a first feeder 106, a second feeder 108, an inlet access point 110 and an outlet access point 112. The container 101 comprises an interior 114 (see FIG. 2) further comprising a first compartment 116 and a second compartment 118.

The container 101 may be partially or completely transparent or translucent to allow a user to view all or part of the interior 114 of the container 101. In one embodiment, all or part of the container 101 may be made of glass, acrylic, or polycarbonate, or any other transparent or translucent material. In another embodiment, the container 101 may include lighting via a window, small interior light, or another lighting source known in the art. In other embodiments, the container may be partially or completely constructed of opaque materials such as wood, plastic, etc.

The removable top 102 allows access to the interior 114 of the container 101. Access to the interior 114 of the container 101 may be necessary for replacing internal components, cleaning the interior and/or components, adding bees to the container 101 and/or removing bees from the container 101.

An access door of conventional design may be present to allow access to the bees that have acclimated to the environment associated with the container 101 and/or other bees within the container 101. In the example shown, the access door is a hinged access area 104. The hinged access area 104 may only allow access to the second compartment 118 of the interior 114 of the container 101. The hinged access area 104 may be selectively moved between an open configuration and a closed configuration.

Bees which are accessible via the hinged access area 104 may be used for apitherapy purposes. Bees in the second compartment 118 of the container 101, which is accessible via the hinged access area 104, will only flee from the container 101 if the bees feel trapped and/or contained. If the bees in the second compartment 118 do not feel trapped and/or contained, they will generally remain inside the container 101 while the hinged access area 104 is in an open configuration.

In one embodiment, there may be an additional access door (not shown) allowing access to the bees in the first compartment 116 for apitherapy purposes. These bees may be more likely to flee from the first compartment 116 if the access door is in an open configuration.

A first feeder 106 and a second feeder 108 allow food such as corn syrup or other conventional feedstocks to be fed into the container 101 as food for the bees. The first feeder 106 may allow food to be fed into the container 101 as food for the new bees in the first compartment 116 of the container 101. The second feeder 108 may allow food to be fed into the container 101 as food for the bees in the second compartment 118 of the container 101. Alternatively, a single feeder may exist that routes food to both the first compartment 116 and the second compartment 118 to simplify feeding for the user.

The inlet access point 110 allows bees to be introduced to the container 101. The inlet access point 110 may comprise one or more apertures that allow bees to be introduced to the container 101. In one embodiment, a user may hold up a separate container or jar of new bees to the container 101 for the bees to enter the container 101.

The container 101 may be configured to at least selectively prevent the bees from escaping from the first compartment 116. In one embodiment, the inlet access points 110 are cone shaped channels with the outer, larger edge of the cone tangential to the outside of the container 101 and the inner, smaller edge of the cone tangential to the inside of the container 101. This allows the bees to enter the container 101 but keeps the bees from escaping through the inlet access points 110. Another embodiment may include a cover over the inlet access points 110 which may transition from an open configuration to a closed configuration to further prevent bees from escaping through the inlet access points 110. The cover over the inlet access points 110 may additionally prevent bees returning from foraging flights from accessing the wrong compartment (i.e., prevent adapted bees from accessing the first compartment 116 when they intended to return to the second compartment 118).

An outlet access point 112 permits ingress and egress of the bees from the second compartment 118. The outlet access point 112 allows bees that have acclimated to the environment associated with the container 101 and/or other bees within the container 101 to exit the container 101 for cleansing flights and foraging purposes common to normal bee life activity. The bees are then capable of reentering the second compartment 118 of the interior 114 of the container 101 via the outlet access point 112.

In one embodiment, the apparatus 100 may be placed outdoors or in a window that allows bees to engage in normal life activities. Bees typically leave the hive during the day for cleansing flights and foraging. Allowing the bees to engage in normal life activities encourages acclimation to the environment associated with the container 101 and may encourage the bees to live longer than they would in a conventional, ventilated jar used by apitherapy patients. The bees that leave the container 101 will return due to their aligning instinct.

The interior 114 of the container 101 comprises a first compartment 116 and a second compartment 118. The interior 114 comprises the internal features of the container 101 including the features described in FIGS. 2-3. The bees may live in the first compartment 116 and/or second compartment 118 of the interior 114 of the container 101.

The first compartment 116 houses new bees that are introduced to the container 101 that have not yet acclimated to the environment of the container 101. The environment may include one or more of the bees, the physical structure of the container 101, etc.

The second compartment 118 houses bees that have acclimated to the environment of the container 101. The environment may include one or more of the bees, the artificial queen pheromone 206 (see FIG. 2), the physical structure of the container 101, etc.

In some approaches, apparatus 100 may comprise an interface for sending images from the apparatus to a computer. The computer may be local, remote, cloud-based, etc. Such an interface may be any type of interface known in the art such as a bus (e.g. Universal Serial Bus (USB)), a wireless interface, a network interface card, etc.

Figure 2:
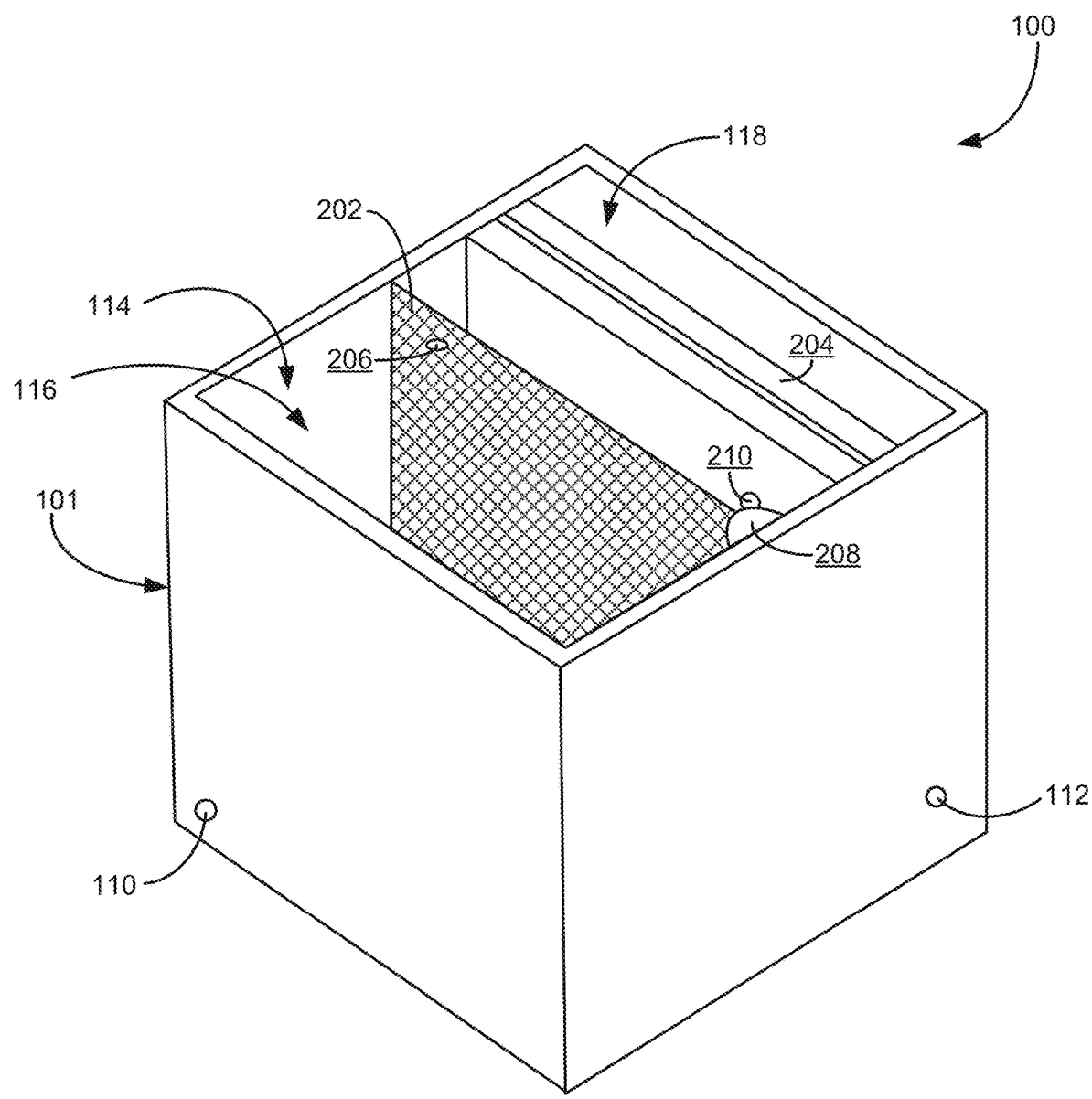
FIG. 2 depicts an exemplary top perspective interior view of the apparatus of FIG. 1.

FIG. 2 depicts an exemplary top perspective interior view of the apparatus 100 of FIG. 1. As shown, the apparatus 100 includes a container 101 with an inlet access point 110 and an outlet access point 112. The container 101 comprises an interior 114 further comprising a first compartment 116 and a second compartment 118. The interior 114 of the container 101 includes a divider 202 coupled to the interior 114 of the container 101, a honeycomb insert 204 coupled to the interior 114 of the container 101, an artificial queen pheromone 206 coupled to the interior 114 of the container 101, an image capture device 208 coupled to the interior 114 of the container 101, and a mechanism 210 for removing bees from an immediate proximity of the image capture device 208.

The internal features of the interior 114 of the container 101 may be in any configuration as long as the internal features remain on the correct side (e.g., the honeycomb insert 204 in the second compartment 118). The internal features are not bound to the exact configuration depicted in the exemplary interior view of the apparatus 100. The quantity of internal features such as the honeycomb insert 204 or image capture device 208 may be modified. For example, there may be more than one image capture device 208 allowing for different and/or multiple views of the interior 114 of the container 101.

A divider 202 in the interior 114 of the container 101 may selectively separate the interior 114 into a first compartment 116 and a second compartment 118. The divider 202 may be configured to keep bees located in the first compartment 116 separated from the bees in the second compartment 118 when the divider 202 is in a closed configuration. The divider 202 may be further configured to allow the bees positioned in the first compartment 116 to enter the second compartment 118 when the divider 202 is in an open configuration.

The divider 202 may comprise a mechanism for transitioning the divider 202 from a closed position to an open configuration. The open configuration allows bees to maneuver from the first compartment 116 to the second compartment 118. The mechanism may include rolling or folding the divider up, down, or to either side, completely or partially. In another embodiment, the mechanism may include splitting the divider into multiple screens before rolling or folding to create an opening. The divider 202 may have a motor that rolls part or all of the screen up or across the interior 114 of the container 101. In another embodiment, the divider 202 may have a rotational cover that may reveal an opening between the first compartment 116 and the second compartment 118. In yet another embodiment, the divider 202 may comprise two offset screens which may be shifted to create larger openings for the bees to move from the first compartment 116 to the second compartment 118.

The mechanism for transitioning the divider 202 from a closed configuration to an open configuration or vice versa may be automatic or manual. The mechanism may be used to automatically transition the divider 202 via a switch or motor. In another embodiment, the mechanism may be manually closed via a mechanical lever, gear, pedal or other physical mechanism exposed to the user on the outside of the container 101.

The divider 202 may be used to keep existing bees in the second compartment 118 separated from newly introduced bees in the first compartment 116 until the newly introduced bees have adapted to the artificial queen pheromone 206 and/or have acclimated to the environment of the container 101. The divider 202 may prevent bees that carry different queen pheromones from fighting each other.

The divider 202 may have a plurality of apertures therein for allowing pheromone to pass from the second compartment 118 to the first compartment 116. The apertures should be small enough that the bees cannot pass through.

Although the divider 202 is shown in the center of the interior 114 of the container 101, the first compartment 116 and the second compartment 118 may be unequal in size. In one embodiment, the first compartment 116 is 35% or less of the volume of the interior 114 of the container 101 and the second compartment 118 is 65% or more of the volume of the interior 114 of the container 101.

The honeycomb insert 204 may comprise of one or more fully drawn honeycomb inserts. The honeycomb insert 204 may further include apertures allowing bees to ingress and egress through the honeycomb insert 204 and maneuver throughout the second compartment 118.

The honeycomb insert 204 allows the bees to exist in a relatively natural environment and engage in normal life activities. This type of environment encourages the bees to live longer and healthier lives as compared to bees kept in traditional, ventilated jars used by apitherapy patients.

An artificial queen pheromone 206 allows for a colony of bees to believe a queen is present and encourages the bees to engage in normal life activities. This environment encourages the bees to live longer and healthier lives as compared to bees kept in traditional, ventilated jars used by most apitherapy patients. An environment without queen pheromones may lead to stress in the bee colony and higher death rates.

In an alternative embodiment, the artificial queen pheromone 206 may be replaced with a real queen bee. This embodiment is useful for a user who wishes to use the bees to pollinate a garden and/or fertilization for flowers, trees, fruit, etc. A real queen bee may also produce new bees in an amount that is useful for an apitherapy patient.

An image capture device 208 may be configured to capture images that may in turn be used to perform visual recognition analysis on the images of the bees for characterizing interactions between the bees in the first compartment 116 and the bees in the second compartment 118.

The image capture device 208 may be located in the interior 114 of the container 101 for capturing images of the bees in the interior 114 of the container 101. The image capture device 208 may be used to monitor bee activity as described further below in the method 400.

The image capture device 208 may be configured to cause the mechanism for transitioning the divider 202 from the closed configuration to the open configuration to transition the divider from the closed configuration to the open configuration in response to determining that the interaction between the bees in the first compartment 116 and the second compartment 118 meets a predefined criteria corresponding to the acclimation of the bees to the environment in the interior 114 of the container 101. The environment may include one or more of the bees, the artificial queen pheromone 206, the physical structure of the container 101, etc.

An exemplary embodiment of the image capture device 208 includes a configuration which allows the image capture device 208 to have a clear view of both the first compartment 116 and the second compartment 118. In another embodiment, the image capture device 208 may comprise one or more image capturing devices.

A mechanism 210 may be used to remove bees from an immediate proximity of the image capture device 208. The immediate proximity of the image capture device 208 may be a lens thereof, a cover thereof, a window through which the image capture device 208 peers, etc. The immediate proximity may be defined as anything between the lens of the image capture device 208 and the area of interest to be viewed.

The mechanism 210 may include a small amount of bee deterrent, a mechanism for applying a stream of compressed air, a wiping mechanism, etc.

Figure 3:
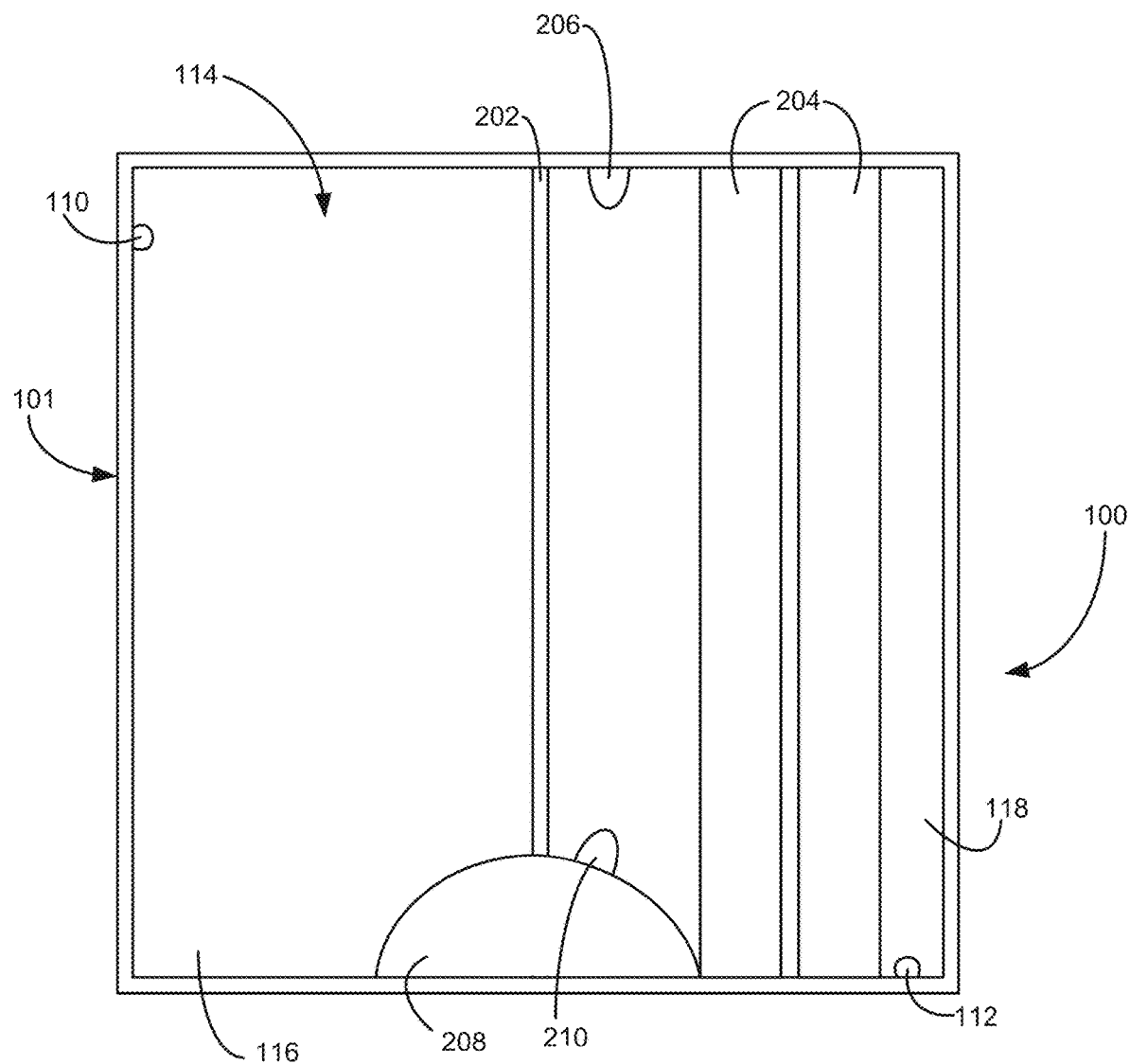
FIG. 3 depicts an exemplary interior view of the apparatus of FIG. 1.

FIG. 3 depicts an exemplary interior view of the apparatus of FIG. 1. As shown, the apparatus 100 includes a container 101 with an inlet access point 110 and an outlet access point 112. The container 101 comprises an interior 114 further comprising a first compartment 116 and a second compartment 118. The interior 114 of the container 101 includes a divider 202 coupled to the interior 114 of the container 101, a honeycomb insert 204 coupled to the interior 114 of the container 101, an artificial queen pheromone 206 coupled to the interior 114 of the container 101, an image capture device 208 coupled to the interior 114 of the container 101, and a mechanism 210 for removing bees from an immediate proximity of the image capture device 208.

Figure 4:
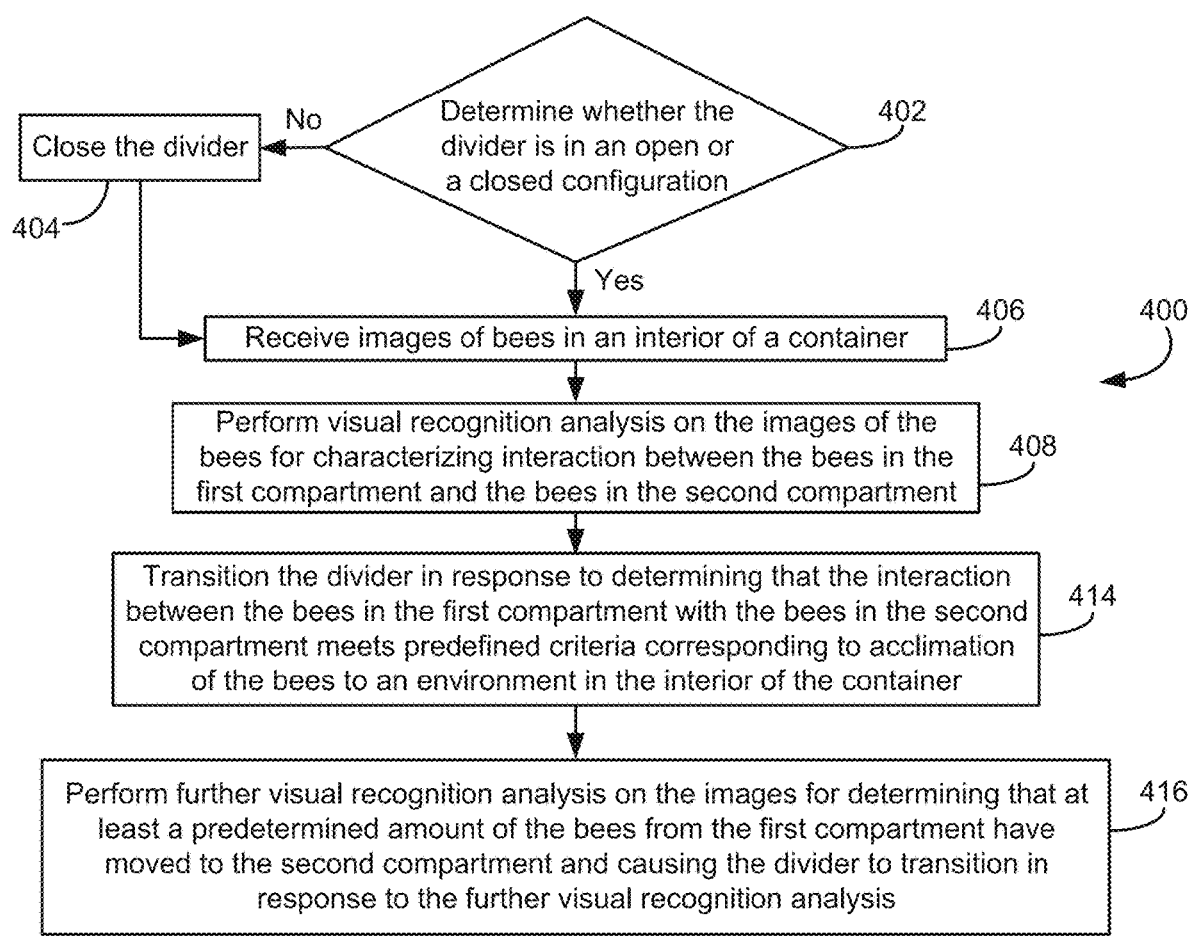
FIG. 4 illustrates a flowchart of a method in accordance with one embodiment

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a local, remote, or cloud-based computer, or some other device having one or more processors therein. The processor (e.g., processing circuit(s), chip(s), and/or module(s)) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, viewed in conjunction with FIGS. 1-3, method 400 may initiate with operation 402, where the computer implemented method comprises determining whether the divider 202 is in an open configuration or a closed configuration. In one embodiment, visual recognition analysis of images captured by the image capture device 208 may be used to determine the configuration of the divider 202. In another embodiment, a sensor may indicate and/or control the mechanism for transitioning the divider 202 from an open configuration to a closed configuration.

Operation 404 of method 400 includes closing the divider 202 if it is determined that the divider 202 is in an open configuration. If the divider 202 is not closed, operation 404 of method 400 initiates the mechanism for transitioning the divider 202 from an open configuration to a closed configuration. If a cover is utilized on inlet access point 110, the cover may be locked until the divider is closed to prevent a user from introducing new bees.

The mechanism for transitioning the divider 202 from a closed position to an open configuration or vice versa may be automatic or manual. The mechanism may be used to automatically transition the divider 202 via a switch or motor. In another embodiment, the mechanism may be manually closed via a mechanical lever, gear, pedal or other physical mechanism exposed to the user on the outside of the container 101. The user may receive notification to close the divider via a connected mobile device or via a visual indication (e.g., Light Emitting Diode (LED)) on the exterior of container 101. An electronically controlled lock may be used on a manually operating the divider mechanism to prevent the user from opening prematurely.

Operation 406 of method 400 includes receiving images of bees in an interior 114 of the container 101 having the divider 202 selectively separating the interior 114 into the first compartment 116 and the second compartment 118, where the divider 202 is configured to keep bees located in the first compartment 116 separated from bees in the second compartment 118 when in a closed configuration. The divider 202 is configured to allow the bees positioned in the first compartment 116 to enter the second compartment 118 when in an open configuration.

The images of the bees in the interior 114 of the container 101 may be received via a direct connection, via a network including a fixed broadband internet, mobile internet, virtual private network (VPN), local area network (LAN), direct networks, etc. In exemplary embodiments, the images may be received via Bluetooth, Wi-Fi, RFID, etc.

Operation 408 of method 400 includes performing visual recognition analysis on the images of the bees for characterizing interactions between the bees in the first compartment 116 and the bees in the second compartment 118. Visual recognition analysis may be performed using Google Image Recognition, Amazon Rekognition, Clarifai, Ditto Labs, Brandwatch Image Insights, GumGum, LogoGrab, IBM Image Detection, or any visual recognition analysis software known in the art. In an exemplary embodiment of method 400, the visual recognition software for performing the visual recognition analysis is Watson™ Visual Recognition API (International Business Machines Corporation (IBM), 1 New Orchard Road, Armonk, N.Y. 10504, United States).

Performing visual recognition analysis may include monitoring the interaction between the bees in the first compartment 116 and the bees in the second compartment 118 of the interior 114 of the container 101. The visual recognition software is preferably trained to recognize interactions between bees that are indicative of positive or negative interactions. Images of known positive or negative interactions may be uploaded to the software in order to train the software to recognize what interactions to detect.

In one approach, the visual recognition analysis on the images may include detecting bees oriented head to head at the divider 202 with proboscises passing through apertures in the divider 202. The visual recognition software may be trained to recognize bees head to head at the divider 202 with proboscises passing through the divider 202 as a positive indicator for acclimation to an environment. This visual typically indicates positive interactions between the bees including passing pheromones. The visual recognition software may be additionally trained to recognize positive interactions between the bees including characteristic "wobble" dancing, "round" dancing, or other movements that bees use to communicate the presence of food in nearby areas, etc.

Additionally and/or alternatively, the visual recognition analysis on the images may include detecting bees attempting to sting through the apertures in the divider 202. The visual recognition software may be trained to recognize bees with rear abdomens curled and/or attempting to sting through the divider 202 as a negative indicator for acclimation to an environment. This visual typically indicates negative interactions between the bees including the use of defense mechanisms.

Operation 414 of method 400 includes causing the mechanism for transitioning the divider 202 from the closed configuration to transition the divider 202 from the closed configuration to the open configuration in response to determining that the interaction between the bees in the first compartment 116 with the bees in the second compartment 118 meets predefined criteria corresponding to acclimation of the bees to an environment in the interior 114 of the container 101. The environment may include one or more of the bees, the artificial queen pheromone 206 (or equivalently, a queen bee), the physical structure of the container 101, etc.

If the visual recognition analysis determines that the bees have not adapted to the artificial queen pheromone 206, method 400 may loop back to operation 406. If the visual recognition analysis determines that the bees have adapted to the artificial queen pheromone 206, the divider 202 may transition from the closed configuration to the open configuration. This allows the bees to move from the first compartment 116 to the second compartment 118.

Determining that the interaction between the bees in the first compartment 116 with the bees in the second compartment 118 meets predefined criteria corresponding to acclimation of the bees to an environment in the interior 114 of the container 101 may include determining that a certain percentage of bees in the first compartment 116 are engaged in positive interaction with bees in the second compartment 118.

Operation 416 of method 400 includes performing further visual recognition analysis on the images for determining that at least a predetermined amount of the bees from the first compartment 116 have moved to the second compartment 118 and causing the mechanism for transitioning the divider 202 from the closed configuration to the open configuration to transition the divider 202 from the open configuration to the closed configuration in response to determining that at least the predetermined amount of the bees from the first compartment 116 have moved to the second compartment 118.

Determining that at least a predetermined amount of the bees from the first compartment 116 have moved to the second compartment 118 may be based on a threshold percentage of bees that have moved to the second compartment 118. The threshold percentage may be equal to or less than 100%.

In another embodiment, operation 414 may leave the divider 202 in an open configuration until a new set of bees is added to the container 101.

In one approach of operation 416, causing the mechanism for transitioning the divider to transition the divider 202 from the closed configuration to the open configuration includes sending an instruction directly to the mechanism. In an alternative embodiment, an instruction is sent to a circuit in direct communication with the mechanism. In yet another embodiment, causing the mechanism for transitioning the divider 202 from the closed configuration to the open configuration to transition the divider 202 from the closed configuration to the open configuration includes sending an alert to a user. An alert may be sent via email, text, visually such as through a lighting mechanism, or any other alert mechanism known in the art.

The mechanism may include rolling or folding the divider 202 up, down, or to either side, completely or partially. In another embodiment, the mechanism may include splitting the divider into multiple screens before rolling or folding to create an opening. The divider 202 may have a motor that rolls part or all of the screen up or across the interior 114 of the container 101. In another embodiment, the divider 202 may have a rotational cover that may reveal an opening between the first compartment 116 and the second compartment 118. In yet another embodiment, the divider 202 may comprise two offset screens which may be shifted to create a larger opening for bees to move from the first compartment 116 to the second compartment 118.

At any time during performance of method 400, a determination may be made as to whether bees in immediate proximity of the image capture device 208 for capturing the images are blocking greater than a threshold amount of a field of view thereof. In response to determining that the bees in the immediate proximity of the image capture device 208 are blocking greater than the threshold amount of the field of view thereof, an instruction may be sent to a mechanism 210 for removing bees from the immediate proximity of the image capture device 208 to remove said bees from the immediate proximity of the image capture device 208. The immediate proximity of the image capture device 208 may be a lens thereof, a cover thereof, a window through which the image capture device 208 peers, etc. The immediate proximity may be defined as anything between the lens of the image capture device 208 and the area of interest to be viewed.

The threshold amount may be set by determining the percentage of covering that prevents the viewing of bee activity. Bee activity may not be observed while the bees are blocking greater than a threshold amount of a field of view of the image capture device 208. In an exemplary embodiment, an instruction to a mechanism for removing bees from the immediate proximity of the image capture device 208 may be sent when the threshold amount of the field of view blocked by bees is approximately 25% or more of the view of the first compartment 116 and the second compartment 118. The divider 202 may remain in its current state until method 400 is able to perform operation 408. Operation 408 may require that the bees cover less than the threshold amount of the field of view of the image capture device 208.

The mechanism 210 may include a small amount of bee deterrent, a mechanism for applying a stream of compressed air, a wiping mechanism, etc.

At any point in method 400, a user may access the interior 114 of the container 101 by opening the hinged access area 104. A user may access the interior 114 of the container 101 by opening the hinged access area 104 in order to access the bees in the second compartment 118 of the interior 114 of the container 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 5:
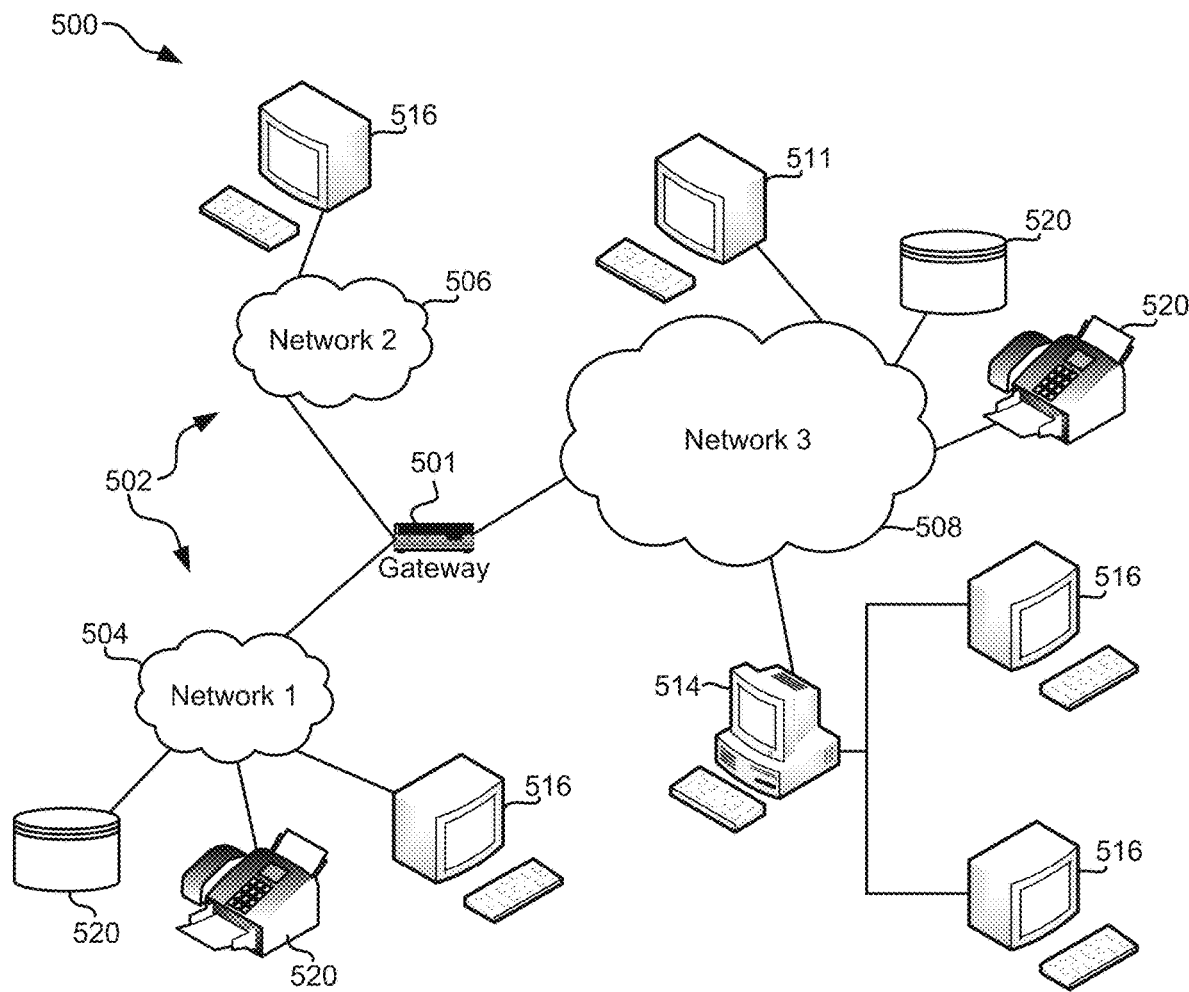
FIG. 5 illustrates a network architecture, in accordance with one embodiment.

FIG. 5 illustrates an architecture 500, in accordance with one embodiment. As shown in FIG. 5, a plurality of remote networks 502 are provided including a first remote network 504 and a second remote network 506. A gateway 501 may be coupled between the remote networks 502 and a proximate network 508. In the context of the present architecture 500, the networks 504, 506 may each take any form including, but not limited to a local area network (LAN), a wide area network (WAN) such as the Internet, public switched telephone network (PSTN), internal telephone network, etc.

In use, the gateway 501 serves as an entrance point from the remote networks 502 to the proximate network 508. As such, the gateway 501 may function as a router, which is capable of directing a given packet of data that arrives at the gateway 501, and a switch, which furnishes the actual path in and out of the gateway 501 for a given packet.

Further included is at least one data server 514 coupled to the proximate network 508, and which is accessible from the remote networks 502 via the gateway 501. It should be noted that the data server(s) 514 may include any type of computing device/groupware. Coupled to each data server 514 is a plurality of user devices 516. User devices 516 may also be connected directly through one of the networks 504, 506, 508. Such user devices 516 may include a desktop computer, lap-top computer, hand-held computer, printer or any other type of logic. It should be noted that a user device 511 may also be directly coupled to any of the networks, in one embodiment.

A peripheral 520 or series of peripherals 520, e.g., facsimile machines, printers, networked and/or local storage units or systems, etc., may be coupled to one or more of the networks 504, 506, 508. It should be noted that databases and/or additional components may be utilized with, or integrated into, any type of network element coupled to the networks 504, 506, 508. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 504, 506, 508, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 6:
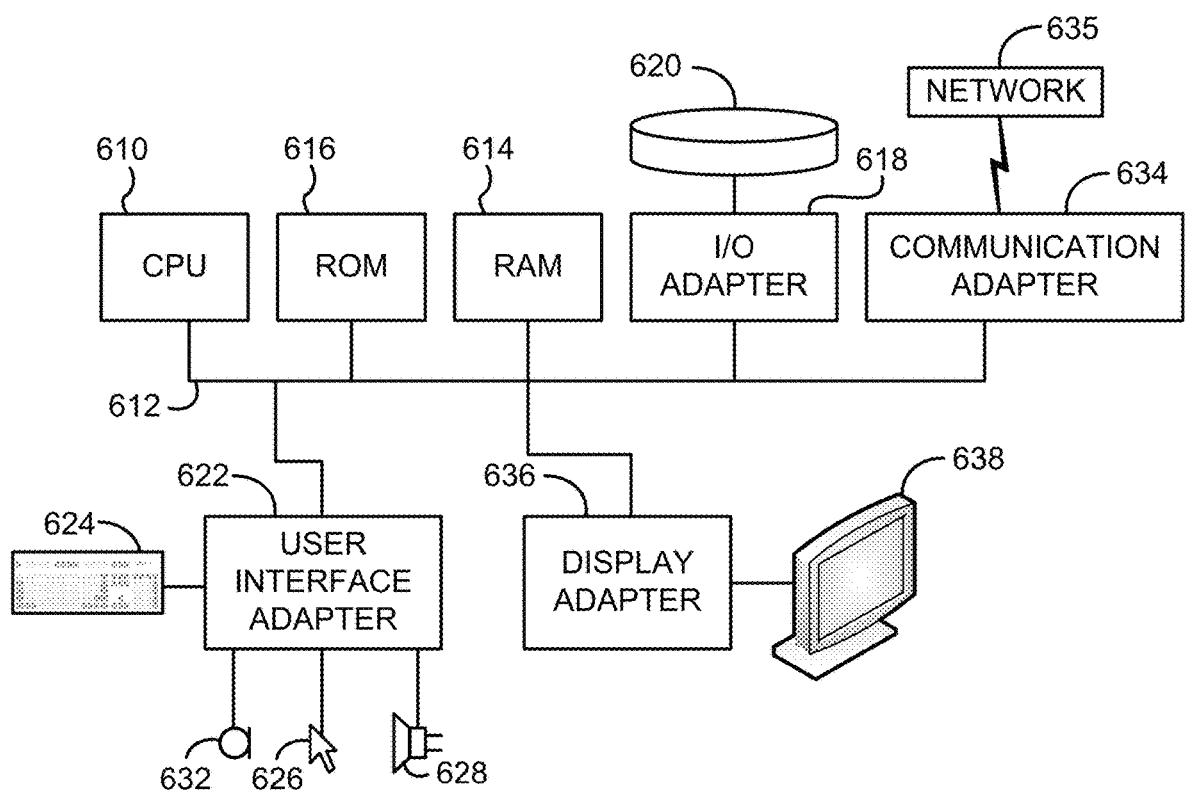
FIG. 6 shows a representative hardware environment that may be associated with the servers and/or clients of FIG. 5, in accordance with one embodiment.

FIG. 6 shows a representative hardware environment associated with a user device 516 and/or server 514 of FIG. 5, in accordance with one embodiment. Such figure illustrates a typical hardware configuration of a workstation having a central processing unit 610, such as a microprocessor, and a number of other units interconnected via a system bus 612.

The workstation shown in FIG. 6 includes a Random Access Memory (RAM) 614, Read Only Memory (ROM) 616, an input/output (I/O) adapter 618 for connecting peripheral devices such as disk storage units 620 to the bus 612, a user interface adapter 622 for connecting a keyboard 624, a mouse 626, a speaker 628, a microphone 632, and/or other user interface devices such as a touch screen and a digital camera (not shown) to the bus 612, communication adapter 634 for connecting the workstation to a communication network 635 (e.g., a data processing network) and a display adapter 636 for connecting the bus 612 to a display device 638.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object-oriented programming methodology. Object oriented programming (OOP), which has become increasingly used to develop complex applications, may be used.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
    a container having an interior;
    a divider in the interior of the container, the divider selectively separating the interior into first and second compartments, wherein the divider is configured to keep bees located in the first compartment separated from bees in the second compartment when in a closed configuration, wherein the divider is configured to allow the bees positioned in the first compartment to enter the second compartment when in an open configuration;
    an image capture device for capturing images of the bees in the interior of the container; and
    an outlet for permitting ingress and egress of the bees from the second compartment,
    wherein the container is configured to prevent the bees from escaping from the first compartment.

2. The apparatus of claim 1, comprising a mechanism for transitioning the divider from the closed configuration to the open configuration.

3. The apparatus of claim 1, wherein the image capture device is configured to perform visual recognition analysis on the images of the bees for characterizing interaction between the bees in the first compartment and the bees in the second compartment.

4. The apparatus of claim 3, comprising a mechanism for transitioning the divider from the closed configuration to the open configuration, wherein the image capture device is configured to cause the mechanism to transition the divider from the closed configuration to the open configuration in response to determining that the interaction between the bees in the first compartment with the bees in the second compartment meets predefined criteria corresponding to acclimation of the bees to an environment in the interior of the container.

5. The apparatus of claim 1, comprising an interface for sending the images from the apparatus to a computer.

6. The apparatus of claim 1, wherein the divider has a plurality of apertures therein for allowing pheromone to pass from the second compartment to the first compartment.

7. The apparatus of claim 1, comprising a mechanism for removing bees from an immediate proximity of the image capture device.

8. A computer-implemented method, comprising:
    receiving images of bees in an interior of a container having a divider selectively separating the interior into first and second compartments, wherein the divider is configured to keep bees located in the first compartment separated from bees in the second compartment when in a closed configuration, wherein the divider is configured to allow the bees positioned in the first compartment to enter the second compartment when in an open configuration;
    performing visual recognition analysis on the images of the bees for characterizing interaction between the bees in the first compartment and the bees in the second compartment; and
    causing a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

9. The computer-implemented method of claim 8, wherein the visual recognition analysis on the images includes detecting bees oriented head to head at the divider with proboscises passing through apertures in the divider.

10. The computer-implemented method of claim 8, wherein the visual recognition analysis on the images includes detecting bees attempting to sting through the divider.

11. The computer-implemented method of claim 8, comprising determining whether bees in immediate proximity of an image capture device for capturing the images are blocking greater than a threshold amount of a field of view thereof; and in response to determining that the bees in the immediate proximity of the image capture device are blocking greater than the threshold amount of the field of view thereof, sending an instruction to a mechanism for removing bees from the immediate proximity of the image capture device to remove said bees from the immediate proximity of the image capture device.

12. The computer-implemented method of claim 8, comprising performing further visual recognition analysis on the images for determining that at least a predetermined amount of the bees from the first compartment have moved to the second compartment; and causing the mechanism for transitioning the divider from the closed configuration to the open configuration to transition the divider from the open configuration to the closed configuration in response to determining that at least the predetermined amount of the bees from the first compartment have moved to the second compartment.

13. The computer-implemented method of claim 8, wherein causing the mechanism for transitioning the divider from the closed configuration to the open configuration to transition the divider from the closed configuration to the open configuration includes sending an instruction directly to the mechanism.

14. The computer-implemented method of claim 8, wherein causing the mechanism for transitioning the divider from the closed configuration to the open configuration to transition the divider from the closed configuration to the open configuration includes sending an alert to a user.

15. A computer program product, the computer program product comprising a computer readable storage medium having program instructions embodied therewith, wherein the computer readable storage medium is not a transitory signal per se, the program instructions executable by a computer to cause the computer to perform a method comprising:

receiving, by the computer, images of bees in an interior of a container having a divider selectively separating the interior into first and second compartments, wherein the divider is configured to keep bees located in the first compartment separated from bees in the second compartment when in a closed configuration, wherein the divider is configured to allow the bees positioned in the first compartment to enter the second compartment when in an open configuration;

performing, by the computer, visual recognition analysis on the images of the bees for characterizing interaction between the bees in the first compartment and the bees in the second compartment; and causing, by the computer, a mechanism for transitioning the divider from the closed configuration to the open configuration to transition the divider from the closed configuration to the open configuration in response to determining that the interaction between the bees in the first compartment with the bees in the second compartment meets predefined criteria corresponding to acclimation of the bees to an environment in the interior of the container.

16. The computer program product of claim 15, wherein the visual recognition analysis on the images includes detecting bees oriented head to head at the divider with proboscises passing through apertures in the divider.

17. The computer program product of claim 15, wherein the visual recognition analysis on the images includes detecting bees attempting to sting through the divider.

18. The computer program product of claim 15, comprising program instructions executable by the computer to cause the computer to determine whether bees in immediate proximity of an image capture device for capturing the images are blocking greater than a threshold amount of a field of view thereof; and in response to determining that the bees in the immediate proximity of the image capture device are blocking greater than the threshold amount of the field of view thereof, send an instruction to a mechanism for removing bees from the immediate proximity of the image capture device to remove said bees from the immediate proximity of the image capture device.

19. The computer program product of claim 15, comprising program instructions executable by the computer to cause the computer to perform further visual recognition analysis on the images for determining that at least a predetermined amount of the bees from the first compartment have moved to the second compartment; and cause the mechanism for transitioning the divider from the closed configuration to the open configuration to transition the divider from the open configuration to the closed configuration in response to determining that at least the predetermined amount of the bees from the first compartment have moved to the second compartment.

20. The computer program product of claim 15, wherein causing the mechanism for transitioning the divider from the closed configuration to the open configuration to transition the divider from the closed configuration to the open configuration is selected from the group consisting of: sending an instruction directly to the mechanism and sending an alert to a user.

\* \* \* \* \*